US007782465B2

(12) United States Patent
Gibler et al.

(10) Patent No.: US 7,782,465 B2
(45) Date of Patent: Aug. 24, 2010

(54) HIGH INTENSITY FABRY-PEROT SENSOR

(75) Inventors: William N. Gibler, The Woodlands, TX (US); Larry A. Jeffers, Minerva, OH (US); Richard L. Lopushansky, The Woodlands, TX (US); Frederick J. Gillham, The Woodlands, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/365,700

(22) Filed: Feb. 4, 2009
(Under 37 CFR 1.47)

(65) Prior Publication Data

US 2009/0207417 A1    Aug. 20, 2009

Related U.S. Application Data

(63) Continuation of application No. 11/377,050, filed on Mar. 16, 2006, now abandoned.

(60) Provisional application No. 60/774,289, filed on Feb. 17, 2006, provisional application No. 60/662,202, filed on Mar. 16, 2005.

(51) Int. Cl.
*G01B 9/02* (2006.01)
*G01L 1/24* (2006.01)
(52) U.S. Cl. .................. 356/480; 356/519; 356/35.5
(58) Field of Classification Search ............... 356/35.5, 356/454, 480, 519; 250/227.19, 227.27; 359/578
See application file for complete search history.

(56) References Cited

U.S. PATENT DOCUMENTS 1,432,149 A    10/1922  Bellingham

| 3,923,400 A | 12/1975 | Hardy |
| 4,210,029 A | 7/1980 | Porter |
| 4,329,058 A | 5/1982 | James et al. |
| 4,393,714 A | 7/1983 | Schmidt |
| 4,418,981 A | 12/1983 | Stowe |

(Continued)

FOREIGN PATENT DOCUMENTS

DE          3127333       1/1983

(Continued)

OTHER PUBLICATIONS

Wavelength Multiplexing of Micromechanical System Pressure and Temperature Sensors Using Fiber Bragg Gratings and Arrayed Waveguide Gratings, Li et al., Optical Engineering Feb. 2003, p. 431-438.
Optical Fiber Sensor Technology, Grattan and Meggitt, 2000, pp. 312-313.
Fiber Optic Sensors, UDD, 1991, p. 147.
IEEE Micro Electro Mechanical Systems Conference, Feb. 7, 1993, Ft. Lauderdale, FL; pp. 230-235; K. Aratani et al., "Process and design considerations for surface icromachined beams for a tuneable interferometer array in silicon".

(Continued)

*Primary Examiner*—Michael A Lyons
(74) *Attorney, Agent, or Firm*—John W. Wustenberg; Booth, Albanesi, Schroede LLC (57) ABSTRACT

A method and apparatus for detecting seismic vibrations using a series of MEMS units, with each MEMS unit including an interferometer is described. The interferometers on the MEMS units receive and modulate light from two differing wavelengths by way of a multiplexing scheme involving the use of Bragg gratings and light circulators, and an optoelectronic processor receives and processes the modulated light to discern vibrational movement of the system, which in turn allows for monitoring and calculation of a specified environmental parameter, such as seismic activity, temperature or pressure.

20 Claims, 7 Drawing Sheets

U.S. PATENT DOCUMENTS

| | | |
|---|---|---|
| 4,428,239 A | 1/1984 | Johnston |
| 4,572,669 A | 2/1986 | James et al. |
| 4,576,479 A | 3/1986 | Downs |
| 4,583,228 A | 4/1986 | Brown et al. |
| 4,596,466 A | 6/1986 | Ulrich |
| 4,606,638 A | 8/1986 | Sommargren |
| 4,628,211 A | 12/1986 | Ruppert |
| 4,640,616 A | 2/1987 | Michalik |
| 4,647,203 A | 3/1987 | Jones et al. |
| 4,648,083 A | 3/1987 | Giallorenzi |
| 4,668,889 A | 5/1987 | Adams |
| 4,678,909 A | 7/1987 | Jackson et al. |
| 4,682,500 A | 7/1987 | Uda |
| 4,729,654 A | 3/1988 | Akuta et al. |
| 4,755,668 A | 7/1988 | Davis |
| 4,777,358 A | 10/1988 | Nelson |
| 4,787,741 A | 11/1988 | Udd et al. |
| 4,806,016 A | 2/1989 | Corpron et al. |
| 4,844,616 A | 7/1989 | Kulkarni et al. |
| 4,873,989 A | 10/1989 | Einzig |
| 4,907,035 A | 3/1990 | Galburt et al. |
| 4,914,666 A | 4/1990 | Glance |
| 4,968,144 A | 11/1990 | Thomas et al. |
| 4,972,077 A | 11/1990 | Willson et al. |
| 4,995,697 A | 2/1991 | Adamovsky |
| 5,034,603 A | 7/1991 | Wilson |
| 5,089,696 A | 2/1992 | Turpin |
| 5,094,534 A | 3/1992 | Cole et al. |
| 5,119,024 A | 6/1992 | Popovic et al. |
| 5,128,537 A | 7/1992 | Halg |
| 5,128,798 A | 7/1992 | Bowen et al. |
| 5,148,604 A | 9/1992 | Bantien |
| 5,177,805 A | 1/1993 | Groger et al. |
| 5,187,546 A | 2/1993 | Johnston |
| 5,202,939 A | 4/1993 | Belleville et al. |
| 5,218,418 A | 6/1993 | Layton |
| 5,218,426 A | 6/1993 | Hall et al. |
| 5,225,888 A | 7/1993 | Selwyn et al. |
| 5,239,400 A | 8/1993 | Liu |
| 5,247,597 A | 9/1993 | Blacha et al. |
| 5,276,501 A | 1/1994 | McClintock et al. |
| 5,283,625 A | 2/1994 | Bunn, Jr. |
| 5,319,981 A | 6/1994 | Mei et al. |
| 5,351,317 A | 9/1994 | Weber |
| 5,361,130 A | 11/1994 | Kersey et al. |
| 5,386,729 A | 2/1995 | Reed et al. |
| 5,392,117 A | 2/1995 | Belleville et al. |
| 5,400,140 A | 3/1995 | Johnston |
| 5,401,956 A | 3/1995 | Dunphy et al. |
| 5,401,958 A | 3/1995 | Berkcan |
| 5,420,688 A | 5/1995 | Farah |
| 5,444,724 A | 8/1995 | Goto |
| 5,451,772 A | 9/1995 | Narendran |
| 5,471,428 A | 11/1995 | Baroni et al. |
| 5,477,323 A | 12/1995 | Andrews et al. |
| 5,497,233 A | 3/1996 | Meyer |
| 5,509,023 A | 4/1996 | Glance et al. |
| 5,526,114 A | 6/1996 | Eselun |
| 5,550,373 A | 8/1996 | Cole et al. |
| 5,557,406 A | 9/1996 | Taylor et al. |
| 5,559,358 A | 9/1996 | Burns et al. |
| 5,631,736 A | 5/1997 | Thiel et al. |
| 5,641,956 A | 6/1997 | Vengsarkar et al. |
| 5,646,762 A | 7/1997 | Delavaux et al. |
| 5,647,030 A | 7/1997 | Jorgenson et al. |
| 5,657,405 A | 8/1997 | Fujiwara |
| 5,682,237 A | 10/1997 | Belk |
| 5,760,391 A | 6/1998 | Narendran |
| 5,784,507 A | 7/1998 | Holm-Kennedy et al. |
| 5,796,007 A | 8/1998 | Panagotopulos et al. |
| 5,818,586 A | 10/1998 | Lehto et al. |
| 5,835,214 A | 11/1998 | Cabib et al. |
| 5,835,645 A | 11/1998 | Jorgenson et al. |
| 5,847,828 A | 12/1998 | Downs |
| 5,852,498 A | 12/1998 | Youvan et al. |
| 5,872,628 A | 2/1999 | Erskine |
| 5,889,590 A | 3/1999 | Duggal et al. |
| 5,891,747 A | 4/1999 | Farah |
| 5,910,840 A | 6/1999 | Furstenau |
| 5,923,030 A | 7/1999 | Assard et al. |
| 5,926,591 A | 7/1999 | Labeye et al. |
| 5,929,990 A | 7/1999 | Hall et al. |
| 5,949,801 A | 9/1999 | Tayebati |
| 5,986,749 A | 11/1999 | Wu et al. |
| 5,999,261 A | 12/1999 | Pressesky et al. |
| 5,999,262 A | 12/1999 | Dobschal et al. |
| 6,016,702 A | 1/2000 | Maron |
| 6,020,963 A | 2/2000 | DiMarzio |
| 6,057,911 A | 5/2000 | Reich |
| 6,064,630 A | 5/2000 | Fersht et al. |
| 6,069,686 A | 5/2000 | Wang et al. |
| 6,075,613 A | 6/2000 | Schermer et al. |
| 6,078,706 A | 6/2000 | Nau et al. |
| 6,088,144 A | 7/2000 | Doerr |
| 6,115,521 A | 9/2000 | Tran et al. |
| 6,118,534 A | 9/2000 | Miller |
| 6,122,415 A | 9/2000 | Blake |
| 6,137,621 A | 10/2000 | Wu |
| 6,151,114 A | 11/2000 | Russell |
| 6,157,025 A | 12/2000 | Katagiri et al. |
| 6,173,091 B1 | 1/2001 | Reich |
| 6,178,001 B1 | 1/2001 | Kim |
| 6,201,289 B1 | 3/2001 | Jou |
| 6,212,306 B1 | 4/2001 | Cooper et al. |
| 6,233,262 B1 | 5/2001 | Mesh et al. |
| 6,272,926 B1 | 8/2001 | Fehrenbach et al. |
| 6,281,976 B1 | 8/2001 | Taylor et al. |
| 6,282,215 B1 | 8/2001 | Zorabedian et al. |
| 6,289,143 B1 | 9/2001 | Berthold et al. |
| 6,304,686 B1 | 10/2001 | Yamate et al. |
| 6,328,647 B1 | 12/2001 | Traudt |
| 6,330,255 B1 | 12/2001 | Hung |
| 6,331,892 B1 | 12/2001 | Green |
| 6,396,605 B1 | 5/2002 | Heflinger et al. |
| 6,422,084 B1 | 7/2002 | Fernald et al. |
| 6,425,290 B2 | 7/2002 | Willcox et al. |
| 6,439,055 B1 | 8/2002 | Maron et al. |
| 6,469,817 B1 | 10/2002 | Heflinger |
| 6,486,984 B1 | 11/2002 | Baney et al. |
| 6,490,038 B1 | 12/2002 | Jung et al. |
| 6,492,636 B1 | 12/2002 | Chen et al. |
| 6,492,800 B1 | 12/2002 | Woods et al. |
| 6,496,265 B1 | 12/2002 | Duncan et al. |
| 6,501,551 B1 | 12/2002 | Tearney et al. |
| 6,522,797 B1 | 2/2003 | Siems et al. |
| 6,538,748 B1 | 3/2003 | Tucker et al. |
| 6,539,136 B1 | 3/2003 | Dianov et al. |
| 6,545,760 B1 | 4/2003 | Froggatt et al. |
| 6,552,799 B1 | 4/2003 | Wright et al. |
| 6,563,968 B2 | 5/2003 | Davis et al. |
| 6,581,465 B1 | 6/2003 | Waters et al. |
| 6,583,882 B2 | 6/2003 | Scruggs et al. |
| 6,594,022 B1 | 7/2003 | Watterson et al. |
| 6,597,458 B2 | 7/2003 | Tayag et al. |
| 6,603,560 B1 | 8/2003 | Islam |
| 6,608,685 B2 | 8/2003 | Wood et al. |
| 6,612,174 B2 | 9/2003 | Sittler et al. |
| 6,621,258 B2 | 9/2003 | Davidson et al. |
| 6,633,593 B2 | 10/2003 | Ksendzov et al. |
| 6,636,321 B2 | 10/2003 | Bohnert |
| 6,643,025 B2 | 11/2003 | Degertekin et al. |
| 6,647,160 B1 | 11/2003 | Chi et al. |
| 6,650,420 B2 | 11/2003 | Houston et al. |
| 6,668,105 B2 | 12/2003 | Chen et al. |

| Patent No. | Date | Inventor |
|---|---|---|
| 6,668,111 B2 | 12/2003 | Tapalian et al. |
| 6,668,656 B2 | 12/2003 | Fernald et al. |
| 6,680,472 B1 | 1/2004 | Thingbø et al. |
| 6,687,011 B1 | 2/2004 | Lee et al. |
| 6,687,036 B2 | 2/2004 | Riza |
| 6,690,873 B2 | 2/2004 | Bendett et al. |
| 6,714,566 B1 | 3/2004 | Coldren et al. |
| 6,714,700 B2 | 3/2004 | Burger et al. |
| 6,717,965 B2 | 4/2004 | Hopkins, II et al. |
| 6,735,224 B2 | 5/2004 | Murry et al. |
| 6,741,357 B2 | 5/2004 | Wang et al. |
| 6,747,743 B2 | 6/2004 | Skinner et al. |
| 6,765,194 B2 | 7/2004 | Holz et al. |
| 6,771,905 B1 | 8/2004 | Bortz |
| 6,776,049 B2 | 8/2004 | Johnson et al. |
| 6,785,004 B2 | 8/2004 | Kersey et al. |
| 6,791,694 B2 | 9/2004 | Pezeshki |
| 6,798,940 B2 | 9/2004 | Lee et al. |
| 6,806,961 B2 | 10/2004 | Hill |
| 6,820,489 B2 | 11/2004 | Fernald et al. |
| 6,822,979 B2 | 11/2004 | Daiber |
| 6,825,934 B2 | 11/2004 | Baney et al. |
| 6,829,073 B1 | 12/2004 | Krol et al. |
| 6,829,259 B2 | 12/2004 | Pontis et al. |
| 6,838,660 B2 | 1/2005 | Duncan et al. |
| 6,839,131 B2 | 1/2005 | Kwon |
| 6,842,254 B2 | 1/2005 | Van Neste et al. |
| 6,879,421 B2 | 4/2005 | Clark et al. |
| 6,882,428 B2 | 4/2005 | Baney et al. |
| 6,886,365 B2 | 5/2005 | Rumpf et al. |
| 6,886,404 B2 | 5/2005 | Digonnet et al. |
| 6,894,787 B2 | 5/2005 | Youngner et al. |
| 6,898,339 B2 | 5/2005 | Shah et al. |
| 6,900,896 B2 | 5/2005 | Motamedi et al. |
| 6,901,088 B2 | 5/2005 | Li et al. |
| 6,901,176 B2 | 5/2005 | Balachandran et al. |
| 6,904,070 B2 | 6/2005 | Pontis et al. |
| 6,909,548 B2 | 6/2005 | Duggan |
| 6,915,048 B2 | 7/2005 | Kersey et al. |
| 6,917,736 B1 | 7/2005 | Ersoy |
| 6,925,213 B2 | 8/2005 | Boyd et al. |
| 6,940,588 B2 | 9/2005 | Woodside et al. |
| 6,947,218 B2 | 9/2005 | Turner, III |
| 6,955,085 B2 | 10/2005 | Jones et al. |
| 6,963,404 B2 | 11/2005 | Chang |
| 6,985,235 B2 | 1/2006 | Bao et al. |
| 6,989,906 B2 | 1/2006 | Sandercock |
| 7,002,697 B2 | 2/2006 | Domash et al. |
| 7,009,691 B2 | 3/2006 | VanWiggeren et al. |
| 7,016,047 B2 | 3/2006 | May |
| 7,019,837 B2 | 3/2006 | Waagaard |
| 7,043,102 B2 | 5/2006 | Okamoto et al. |
| 7,046,349 B2 | 5/2006 | Everall et al. |
| 7,047,816 B2 | 5/2006 | Jones et al. |
| 7,065,108 B2 | 6/2006 | Park et al. |
| 7,134,346 B2 | 11/2006 | Lopushansky et al. |
| 7,139,081 B2 | 11/2006 | DeGroot |
| 7,139,295 B2 | 11/2006 | Tsai et al. |
| 7,173,713 B2 | 2/2007 | Xu et al. |
| 7,230,959 B2 | 6/2007 | Johnson |
| 7,305,158 B2 | 12/2007 | Jeffers et al. |
| 7,355,684 B2 | 4/2008 | Jeffers et al. |
| 7,355,726 B2 | 4/2008 | Jeffers et al. |
| 7,405,829 B2 | 7/2008 | Shen |
| 7,423,762 B2 | 9/2008 | Schmidt |
| 7,434,472 B2 | 10/2008 | Leitko et al. |
| 7,492,463 B2 | 2/2009 | Lopushansky et al. |
| 7,511,823 B2 | 3/2009 | Schultz et al. |
| 2001/0013934 A1 | 8/2001 | Varnham et al. |
| 2002/0015155 A1 | 2/2002 | Pechstedt et al. |
| 2002/0041722 A1 | 4/2002 | Johnson et al. |
| 2002/0109081 A1 | 8/2002 | Tarvin et al. |
| 2002/0167730 A1 | 11/2002 | Needham et al. |
| 2002/0186377 A1 | 12/2002 | Kuskovsky et al. |
| 2003/0020926 A1 | 1/2003 | Miron |
| 2003/0025912 A1 | 2/2003 | Hui et al. |
| 2003/0043697 A1 | 3/2003 | Vakoc |
| 2003/0081875 A1 | 5/2003 | Kochergin et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0159518 A1 | 8/2003 | Sawatari et al. |
| 2003/0184867 A1 | 10/2003 | Clark |
| 2004/0008742 A1 | 1/2004 | Chou et al. |
| 2004/0013040 A1 | 1/2004 | Maas et al. |
| 2004/0013356 A1 | 1/2004 | Wang et al. |
| 2004/0113104 A1 | 6/2004 | Maida, Jr. |
| 2004/0141184 A1 | 7/2004 | Ueki |
| 2004/0151216 A1 | 8/2004 | Tsai et al. |
| 2004/0151438 A1 | 8/2004 | Ferguson |
| 2004/0196874 A1 | 10/2004 | Spiegelberg et al. |
| 2004/0202399 A1 | 10/2004 | Kochergin et al. |
| 2005/0046862 A1 | 3/2005 | Melnyk |
| 2005/0073690 A1 | 4/2005 | Abbink et al. |
| 2005/0105098 A1 | 5/2005 | Johansen et al. |
| 2005/0213870 A1 | 9/2005 | Kersey et al. |
| 2005/0218299 A1 | 10/2005 | Olsen et al. |
| 2005/0231729 A1 | 10/2005 | Lopushansky et al. |
| 2005/0231730 A1 | 10/2005 | Jeffers et al. |
| 2005/0237538 A1 | 10/2005 | Belleville |
| 2005/0242096 A1 | 11/2005 | Jaghab |
| 2006/0034569 A1 | 2/2006 | Shih et al. |
| 2006/0139652 A1 | 6/2006 | Berthold |
| 2006/0146337 A1 | 7/2006 | Hartog |
| 2006/0152733 A1 | 7/2006 | Waagaard |
| 2006/0241889 A1 | 10/2006 | Lopushansky et al. |
| 2006/0274323 A1 | 12/2006 | Gibler et al. |
| 2007/0006663 A1 | 1/2007 | Zerwekh et al. |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043245 A1 | 2/2008 | Needham |
| 2008/0174781 A1 | 7/2008 | Berthold et al. |
| 2008/0186506 A1 | 8/2008 | Lopushansky |
| 2008/0297808 A1 | 12/2008 | Riza et al. |
| 2009/0056447 A1 | 3/2009 | Berthold et al. |

FOREIGN PATENT DOCUMENTS

| | | |
|---|---|---|
| DE | 3411096 | 6/1983 |
| EP | 0397388 | 11/1990 |
| EP | 0400939 | 12/1990 |
| EP | 0452993 | 10/1991 |
| EP | 0549166 | 6/1993 |
| EP | 0571107 | 11/1993 |
| EP | 0597345 | 11/1999 |
| EP | 1586854 | 10/2005 |
| GB | 1168971 | 10/1969 |

OTHER PUBLICATIONS

Journal of Vacuum Science and Technology: Part A, vol. 8, No. 4, Jul. 1990, New York US; pp. 3606-3613; D. W. Burns et al., "Thin films for micromechanical sensors".

Optical Engineering, vol. 31, No. 8, Aug. 1992, Bellingham US, pp. 1638-1642; D. Angelidis et al., "Optical micromachined pressure sensor for aerospace application".

Sensors and Actuators, vol. 20, No. 1-2, Nov. 15, 1989, Lausanne, CH, pp. 143-151; M. W. Putty et al., "Process integration for active polysilican resonant microstructures".

Sensors and Actuators, A., vol. A21-A23, No. 1-3, Feb. 1990, Lausanne, CH, pp. 387-390, R. M. Pitcher et al., "Optothermal drive of silicon resonators: the influence of surface coatings".

IEE Proceedings D. Control Theory & Applications, vol. 135, No. 5, Sep. 1988, Stevenage, GB, pp. 364-368, M. J. Tudor et al., "Silicon resonator sensors: interrogation techniques and characteristics".

Electronics Letters, vol. 22, No. 21, Oct. 9, 1986, Stevenage, GB, pp. 1097-1099, M. V. Andres et al., "Optical activation of a silicon vibrating sensor".

"Single Mode Fiber Optics", 1983, Jeunhomme, p. 100.

Electronics Letters, vol. 22, No. 21; Oct. 9, 1986; Stevenage, GB; pp. 1097-1099; M. V. Andres et al., "Optical activation of a silicon vibrating sensor".

Proc. SPIE, vol. 3762, 1999, R. L. Johnson, et al. "Miniature Instrument for the Measurement of Gap Thickness Using Polychromatic Interferometry".

IEEE Sensors Journal, vol. 3, No. 6, pp. 812-817, Dec. 2003, Tseng et al. "Polymer MEMS-Based Fabry-Perot Shear Stress Sensor".

Proc. SPIE, vol. 5589, 2004, MacDougall, Trevor W. and Sanders, Paul E., "Large Diameter Waveguide Bragg Grating Components and Their Application in Downhill Oil & Gas".

Proc. SPIE, vol. 3762, pp. 245-253; 1999, R. L. Johnson, et al. "Miniature Instrument for the Measurement of Gap Thickness Using Polychromatic Interferometry".

Proc. SPIE, vol. 5589, 2004, MacDougall, Trevor W. and Sanders, Paul E. "Large Diameter Waveguide Bragg Grating Components and Their Application in Downhill Oil & Gas".

Alan D Kersey.; Fiber Grating Sensors; Journal of Lightwave Technology, vol. 15, No. 8, Copyright 1997 IEEE.

J.R. Clowes, et al.; Effects of High Temperature and Pressure on Silica Optical Fiber Sensors; IEEE Photonics Technology Letters, vol. 10, No. 3; Copyright 1998 IEEE.

J.M. Senior; Multiplexing Techniques for Noninterferometric Optical Point-Sensor Networks: A Review, Fiber and Integrated Optics, 17:3-20; Copyright 1998 Taylor & Francis.

Chi Chiu Chan, et al.; Performance Analysis of a Time-Division-Multiplexed Fiber Bragg Grating Sensor Array by Use of a Tunable Laser Source, IEEE Journal of Selected Topics in Quantum Electronics, vol. 6, No. 5; Copyright 2000 IEEE.

HIGH INTENSITY FABRY-PEROT SENSOR

CROSS-REFERENCE TO RELATED APPLICATIONS

This application is a continuation of U.S. patent application Ser. No. 11/377,050 to Gibler et al. filed on Mar. 16, 2006 now abandoned. This application claims priority from U.S. Provisional Patent Application No. 60/662,202 filed on Mar. 16, 2005, which is hereby incorporated by reference, and claims priority from U.S. Provisional Patent Application No. 60/774,289 filed on Feb. 17, 2006, which is also hereby incorporated by reference.

FIELD OF INVENTION

The present invention relates to sensors for measuring the absolute length of a gap in a Fabry-Perot interferometer, and more particularly to a Fabry-Perot sensor that provides a more intense signal.

BACKGROUND OF THE INVENTION

The use of Fabry-Perot interferometers to measure the absolute length of a gap is known. Use of a ball lens to collimate light shining on a Fabry-Perot interferometer is needed for sensors measuring gaps exceeding about 30 um in order to maintain a uniform optical path length for all light rays and to assure a high percentage of the light reflected by the interferometer is captured by the fiber. However, if the light delivery fiber is not precisely centered on the ball lens axis or if the interferometer is not precisely perpendicular to the axis of the incident light transmitted by the ball lens, then the reflected light from the diaphragm does not re-enter the fiber because the reflected light spot that is re-imaged by the ball lens is not centered on the end of the input fiber. As a result, if insufficient light reflected from the sensor re-enters the fiber, the results from the Fabry-Perot interferometer-based sensor are compromised.

Accordingly, a Fabry-Perot interferometer-based sensor with a ball lens and alignment scheme that reflects high intensity light signals would provide benefits such as improved power budget, improved signal to noise ratio, and would be welcomed by the industry.

SUMMARY OF THE INVENTION

The present application discloses a sensor assembly that comprises an optical fiber having an optical axis, a lens in optical communication with the optical fiber, the lens having an optical axis and the lens capable of transmitting a beam of light, a reflective surface, the reflective surface spaced from the lens such that the beam of light transmitted from the lens is capable of reflecting from the reflective surface back to the lens, and an alignment device capable of aligning the beam of light transmitted from the lens substantially perpendicular with the reflective surface.

Another embodiment discloses a Fabry-Perot sensor assembly that comprises an optical fiber, a ball lens in optical communication with the optical fiber the ball lens capable of transmitting a beam of light, a window having a first surface and a second surface, a diaphragm spaced from and parallel to the second surface of the window, the diaphragm having a partially reflective surface, and an alignment device capable of aligning the beam of light transmitted from the ball lens substantially perpendicular with the partially reflective dielectric coating of the diaphragm.

In yet another embodiment, a sensor assembly comprises a body having a socket, a ball rotatably positioned in the socket of the body, an optical fiber, at least a portion of the optical fiber positioned in the ball, a ball lens attached to the optical fiber, the ball lens capable of transmitting a beam of light, a diaphragm having a reflective surface, the diaphragm spaced from the ball lens such that the beam of light transmitted by the ball lens is capable of reflecting from the surface of the diaphragm back to the ball lens, and wherein rotation of the ball aligns the beam of light transmitted from the ball lens substantially perpendicular with the reflective surface of the mesa diaphragm.

DESCRIPTION OF THE DRAWINGS

Operation may be better understood by reference to the following detailed description taken in connection with the following illustrations, wherein.

DETAILED DESCRIPTION

While the present invention is described with reference to the embodiments described herein, it should be clear that the present invention should not be limited to such embodiments.

Therefore, the description of the embodiments herein is illustrative of the present invention and should not limit the scope of the invention as claimed.

Figure 1A:
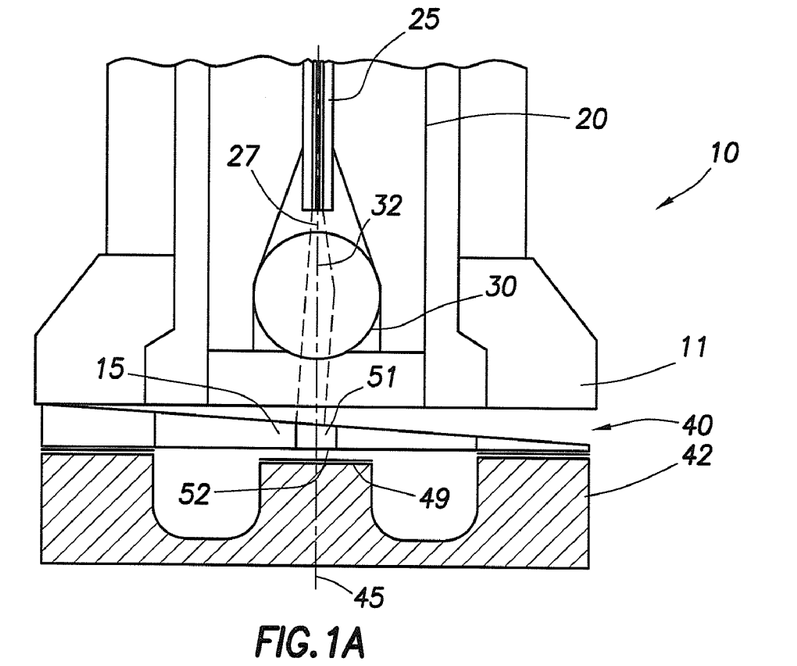
FIG. 1A is a concept drawing of a Fabry-Perot interferometer based sensor assembly with a ball lens and Fabry-Perot gap, wherein the window is a wedge with nonparallel surfaces.

To obtain the maximum light intensity using a Fabry-Perot interferometer based sensor, it is necessary to assure the optical fiber is precisely centered on the lens optical axis and the second reflector in the Fabry-Perot interferometer is precisely perpendicular to the beam of light transmitted from the lens. Since these conditions cannot be met precisely in manufacturing practice, certain adjustments are necessary to achieve these results. An embodiment of a Fabry-Perot interferometer based sensor 10 is shown in FIG. 1A. In this embodiment, a wedge shaped window assembly 15 is used rather than a plane-parallel window as an alignment device. The Fabry-Perot interferometer based sensor 10 comprises a transducer body 11, a ferrule 20, an optical fiber 25 having an optical fiber axis 27, a lens 30 having a lens optical axis 32, and a Fabry-Perot sensor 40. Despite only a ball lens being shown in FIG. 1, any sort of lens that focuses and collimates light can be used, e.g., a graded index lens or a ball lens. The Fabry-Perot sensor 40 comprises a wedge shaped window assembly 15 and a diaphragm 42 having an optical axis 45 and a reflective surface 49. The wedge shaped window assembly 15 comprises one surface 52 that serves as the first partially reflector in a Fabry-Perot interferometer where the window assembly 15 is located between the lens 30 and a second reflector 49 in the Fabry-Perot interferometer, which allows for proper operation of the invention with long gaps. Rotation of the wedge-shaped window assembly 15 causes a change in the angle of refraction into and out of the window assembly 15 until the window assembly 15 is in the precise rotational location where the column or beam of light transmitted from the lens 30, is perpendicular to the first reflective surface 52 on the window assembly 15. Additionally, the lens optical axis 32 is perpendicular to the surface 49 of the diaphragm 42, as well as the optical axis 27 of the optical fiber 25 being perpendicular to the first reflective surface 52 of the window assembly 15 and the surface 49 of the diaphragm 42.

Figure 1B:
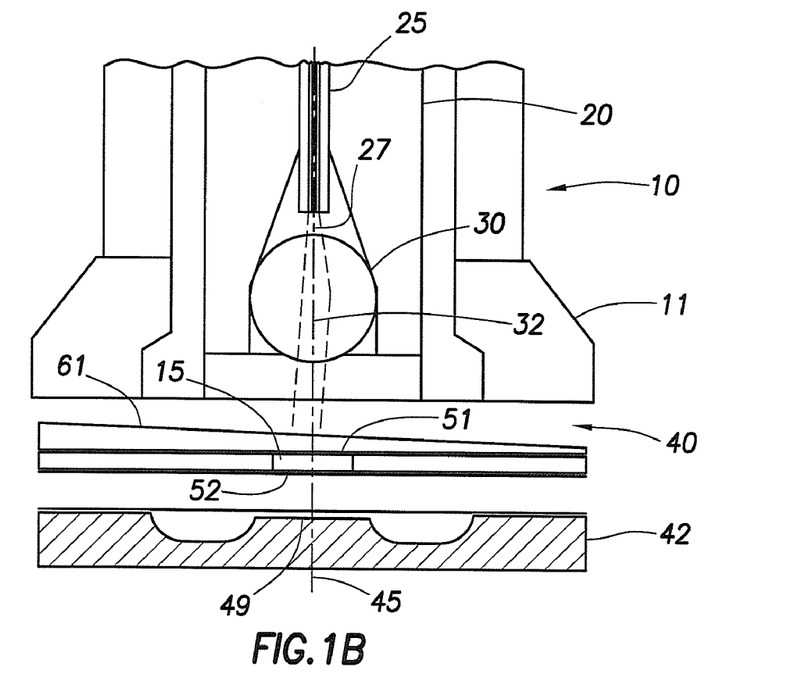
FIG. 1B is a concept drawing of a Fabry-Perot interferometer based sensor assembly with a ball lens, a Fabry-Perot gap, and a wedge-shaped spacer that is used with a window having parallel surfaces.

Alternatively, the window surfaces 51, 52 can be maintained parallel to each other and parallel to the second reflector surface 49 in the Fabry-Perot sensor. Plane-parallel windows are easier to manufacture. In this embodiment, the alignment device comprises a wedge-shaped spacer 61 located between the lens and the reflective surface as shown in FIG. 1B. Accordingly, to provide the angle tuning, the wedge-shaped spacer 61 is inserted until the column or beam of light transmitted from the lens 30, is perpendicular to the reflective surface on the diaphragm. Spacers 61 with different wedge angles can be matched to different transducer bodies to collect for variation in manufacturing tolerances of the transducer bodies and to optimize light transmission.

Figure 2:
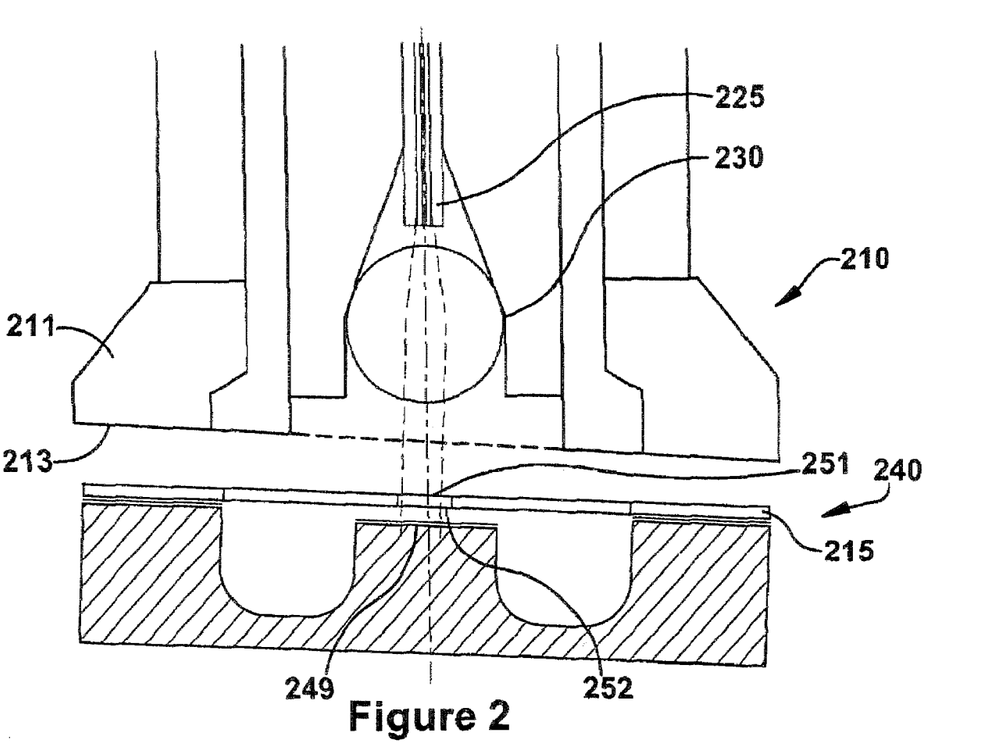
FIG. 2 is a concept drawing of sensor assembly with ball lens and Fabry-Perot gap, wherein the two surfaces of the window are plane parallel (where one surface is a first reflector in a Fabry-Perot interferometer) and the transducer body is machined at the desired angle to maximize the reflected light signal.

As shown in FIG. 2, another alternative embodiment of a Fabry-Perot interferometer based sensor 210 is shown. In this embodiment, the Fabry-Perot interferometer based sensor 210 maintains the window surfaces 251, 252 parallel to each other and parallel to the second reflector surface 249 in the Fabry-Perot sensor 240. To provide the angle tuning, the alignment device comprises a surface 213 of the transducer body 211 that mates with the window assembly 215 that is machined at the desired angle after the ball lens 230 and optical fiber 225 assembly are bonded. In this alternative embodiment, the window assembly 215 does not need to be rotated to bring the window 215 into precise alignment with the transducer 211. It is simply attached to the transducer body 211 at any rotational position. The transducer body 211 is machined at a predetermined angle to produce the desired tilt angle of the Fabry-Perot interferometer based sensor. In other words, the alignment device comprises the transducer body 211 having its end surface or face 213 machined at an angle relative to its axis to align the beam of light transmitted from the lens perpendicular with the reflective surface 249 of the diaphragm. The desired tilt angle of the transducer body 211 is also when a light beam transmitted from the ball lens 230 is perpendicular to the end face 213 of the transducer body 211. This ensures the light beam is perpendicular to the diaphragm surface 249, as shown in FIG. 2. This approach can also be used even when there is no ball lens and no window, to correct for any misalignment of the light beam with the transducer body and second reflector of the Fabry-Perot sensor, i.e. the diaphragm surface.

Figure 10:
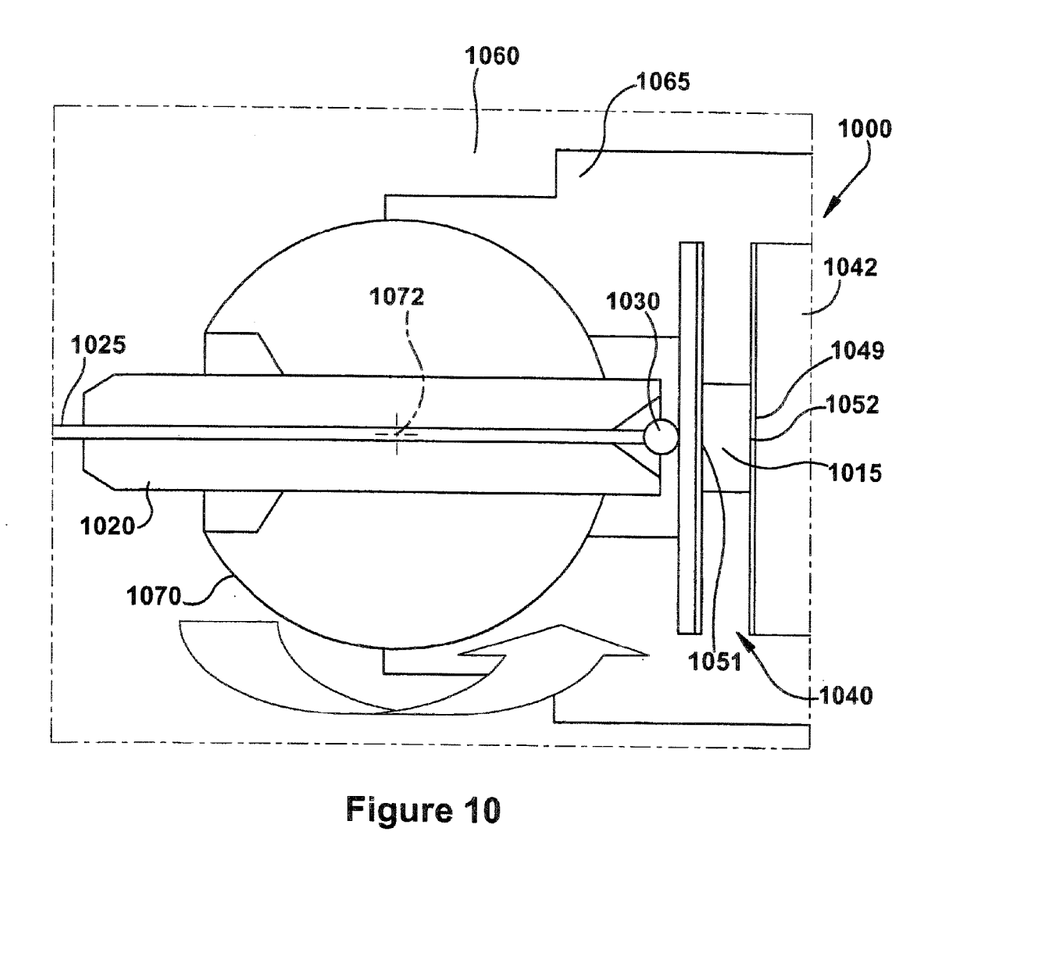
FIG. 10 shows a cross-section drawing of ball and socket alignment device of an optical fiber with fused ball lens.

In the yet another embodiment, the method for pointing the light beam to achieve perpendicularity with the diaphragm is to use a metal ball-and-socket assembly shown in FIG. 10. In this embodiment, the Fabry-Perot interferometer based sensor 1000 comprises a ferrule 1020, an optical fiber 1025, a lens 1030, a Fabry-Perot sensor 1040, and an alignment device. The alignment device comprises a body 1060 having a socket 1065, and a ball 1070. The Fabry-Perot sensor 1040 comprises a window assembly 1015 and a diaphragm 1042. The window assembly 1015 comprises one surface 1052 that serves as the first reflector in a Fabry-Perot interferometer where the window 1015 is between the lens 1030 and a second reflector 1049 in the Fabry-Perot interferometer. This allows for proper operation of the embodiment with long gaps. The window assembly 1015 also includes another surface 1051 parallel to the surface 1052. The ball 1070 can be a metal ball, but is not limited to such. It can be of any material. The ball 1070 is rotatably attached in the socket 1065. Held inside the metal ball 1070 is the ferrule 1020 that holds the optical fiber 1025 and lens 1030. The metal ball 1070 can be rotated in its mating socket 1065 through two degrees of freedom about the center-of-rotation 1072, as shown by the arrow. In this manner the light beam angle transmitted from the lens 1030 is fine-tuned to be perpendicular to the diaphragm 1042 surface 1049.

Various alternatives have been modeled using optical ray tracing software. In one embodiment, a 2 mm diameter ball lens that is configured according to the drawing in FIG. 3 has the design parameters presented in Table 1.

TABLE 1

Figure 3:
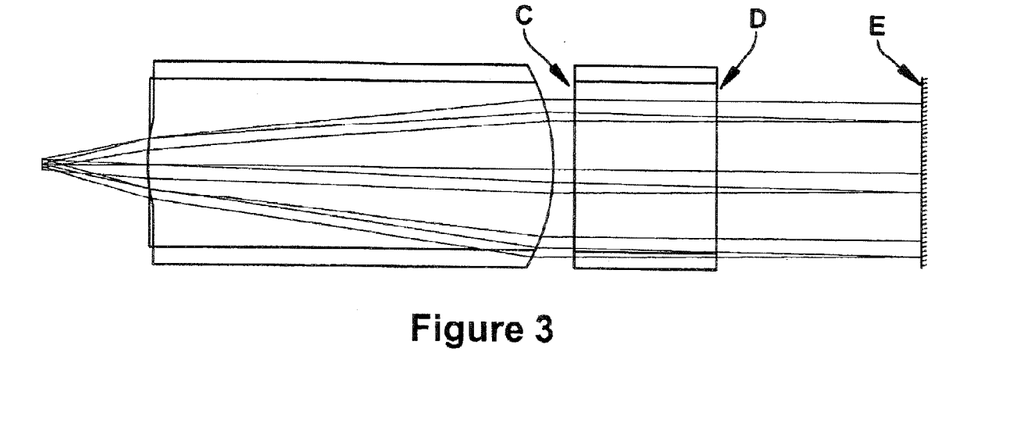
FIG. 3 is a ray trace drawing of a 2 mm diameter ball lens with de-centering of the delivery fiber relative to the ball lens and tilt of the diaphragm relative to the fiber, where the lens-to-window spacing 0.1 mm; the window thickness=0.7 mm; the window-reflector spacing (gap)=1 mm; the fiber de-center=0.5 mm; and the tilt angle=0.5°.

Parameter definitions for design in FIG. 3. For a lens with 2 mm FS ball w 0.7 mm thick window

| SRF | RADIUS | THICK-NESS | APERTURE RADIUS | GLASS |
|---|---|---|---|---|
| OBJ | — | 0.530000 | 0.025000 | AIR |
| AST | 1.000000 | 2.000000 | 0.119528 AS | FK3 (fused silica) |
| 2 | −1.000000 | 0.100000 | 0.418365 S | AIR |
| 3 | — | 0.700000 | 0.420979 S | BK7 (glass) |
| 4 | — | 1.000000 | 0.433099 S | AIR |
| 5 | — | −1.000000 | 0.459240 S | REFL_HATCH * |
| 6 | — | −0.700000 | 0.48538 1 S | BK7 |
| 7 | — | −0.100000 | 0.497501 5 | AIR |
| 8 | −1.000000 | −2.000000 | 0.500115 5 | FK3 |
| 9 | 1.000000 | −0.530000 | 0.221589 S | AIR |
| IMS | — |  | 0.060116S |  |

| 0 | DT 1 | DCX | — | DCY | 0.050000 | DCZ | — |
|---|---|---|---|---|---|---|---|
|  |  | TLA | — | TLB | — | TLC | — |
| 3 | DT 1 | DCX | — | DCY | — | DCZ | — |
|  |  | TLA | −0.500000 | TLB | — | TLC | — |
| 5 | DT 1 | DCX | — | DCY | — | DCZ | — |
|  |  | TLA | −0.500000 | TLB | — | TLC | — |
| 7 | DT 1 | DCX | — | DCY | — | DCZ | — |
|  |  | TLA | −0.500000 | TLB | — | TLC | — |

* TILT/DECENTER DATA

Figure 4:
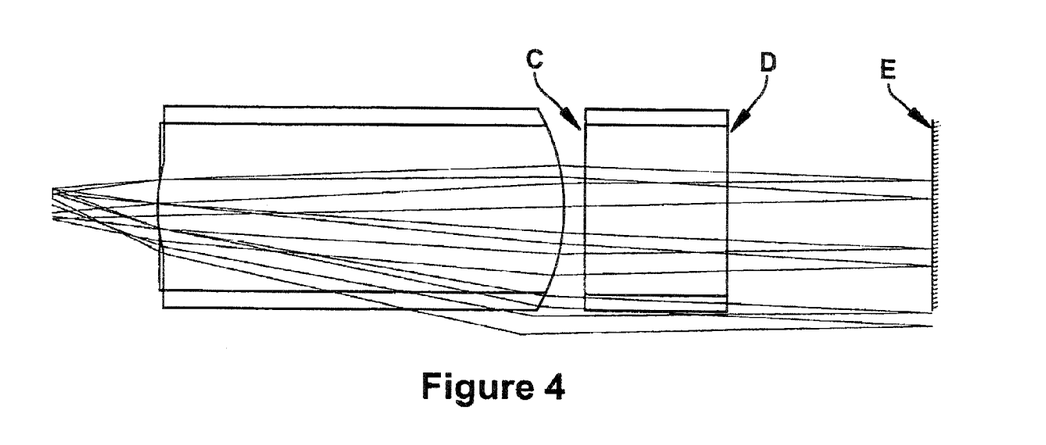
FIG. 4 is a ray trace drawing of a 2 mm diameter ball lens with de-centering of the delivery fiber relative to the ball lens and no tilt of the diaphragm relative to the fiber (i.e., reflected rays do not re-enter fiber), where the lens-window spacing 0.1 mm; the window thickness 0.7 mm; the window-reflector spacing (gap) 1 mm; the fiber de-center=0.05 mm; and the tilt angle=0.

The tilt angle is an input parameter to the ray trace. The same tilt angle is applied to each window surface C and D and the reflector E. FIG. 4 shows what happens if the fiber de-center remains 0.05 mm and the tilt angle is set to 0. The reflected rays miss the end of the fiber. Compare FIG. 4 with FIG. 3, where the reflected rays re-enter the fiber. The object and image size in FIG. 3 is roughly 0.065 mm (total spot size, not rms). In FIG. 4, the size of the image (reflected spot) is roughly 0.115 mm and is not centered about the object (fiber end).

As previously discussed, a configuration to collimate light shining on the diaphragm of a fiber optic Fabry-Perot pressure sensor is shown in FIGS. 1 and 2. A light delivery fiber and a ball lens are not attached to one another.

In addition to the alignment issues caused by the non-attached ball lens and fiber, the non-attached case results in two unwanted reflective surfaces (the fiber end and the ball lens input surface) that could interfere with the desired signal from the Fabry-Perot sensor. In the embodiment shown in FIG. 10, the ball lens 1030 is attached to the optical fiber 1025. More specifically, the ball lens 1030 is fused and centered on the end of the optical fiber 1025 minimizing the de-centering problem and eliminating two unwanted reflective surfaces. A ball lens is fused to the silica optical fiber by heating the end of the fiber to the melting point. During melting of the fiber, surface tension produces a sphere of transparent silica, and when the melted silica refreezes, the ball lens is permanently fused to the end of the fiber. Alternatively, the ball lens 1030 can be bonded to the optical fiber 1025 using an adhesive. The typical diameter of the ball lens formed in this manner is 340/Lm.

Figure 5:
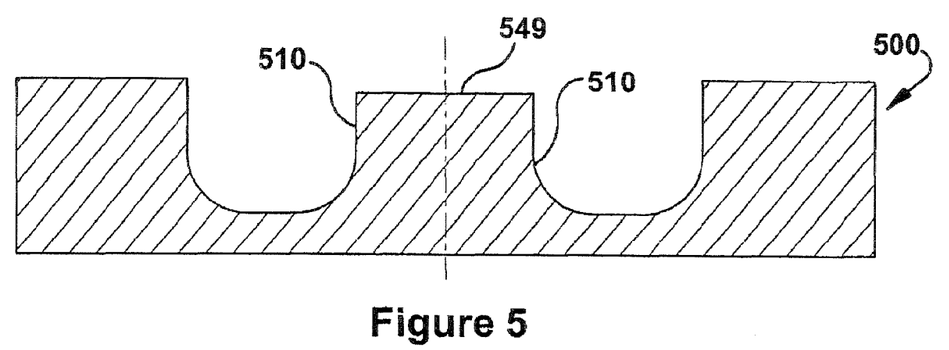
FIG. 5 shows a cross section of a second reflector in the Fabry-Perot interferometer with a mesa diaphragm configuration.
Figure 6:
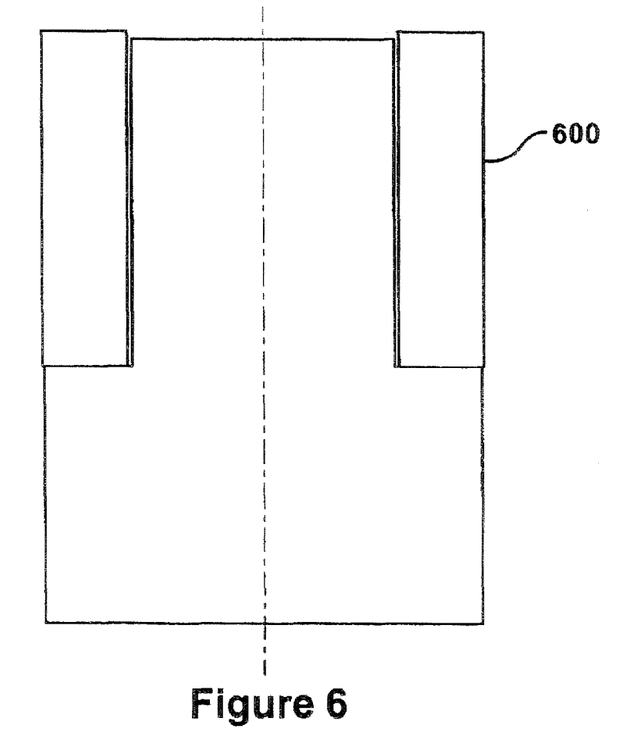
FIG. 6 shows a cross section of a second reflector in the Fabry-Perot interferometer with a plug diaphragm configuration.
Figure 7:
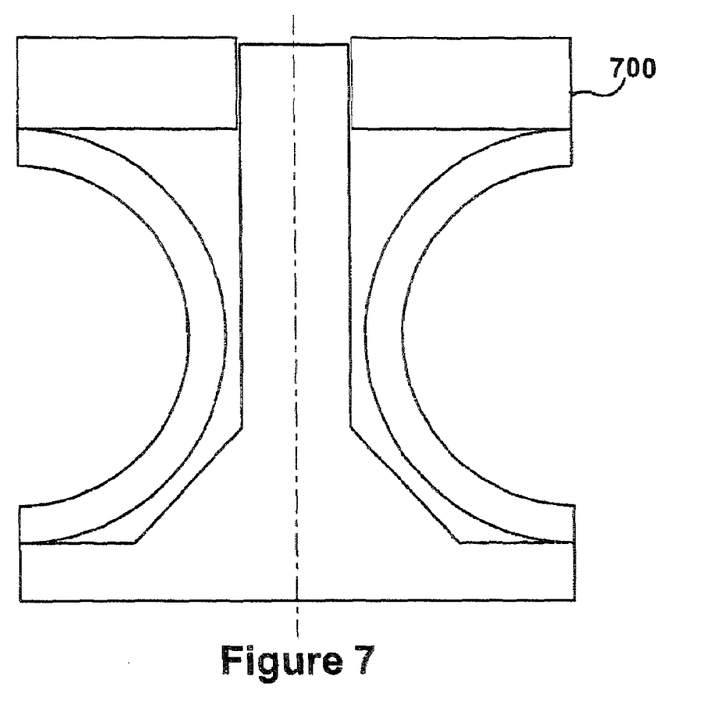
FIG. 7 shows a cross section of a second reflector in the Fabry-Perot interferometer with a bellows diaphragm configuration.

An additional way to improve the performance of the Fabry-Perot interferometer based sensor is to machine a feature (such as a circular groove) into the diaphragm that causes the surface of the diaphragm to translate without bending as the diaphragm deflects. This feature could be configured as a mesa 500 (which is the circular groove cut into the diaphragm substantially surrounding the flat mesa reflective surface of the diaphragm), a plug 600, or a bellows 700 as depicted in FIGS. 5, 6, and 7, respectively. As shown in FIG. 5, the mesa diaphragm 500 includes a circular groove 510 cut therein. As shown, the circular groove 510 surrounds the reflective surface 549 of the diaphragm 500.

Another way to improve the performance of the Fabry-Perot interferometer based sensor 10 is to attach a glass plate and/or dielectric coating 49 to the surface of the diaphragm 42 that allows the reflectance of the diaphragm 42 to be optimized and to remain uniform with time and temperature.

Figure 8:
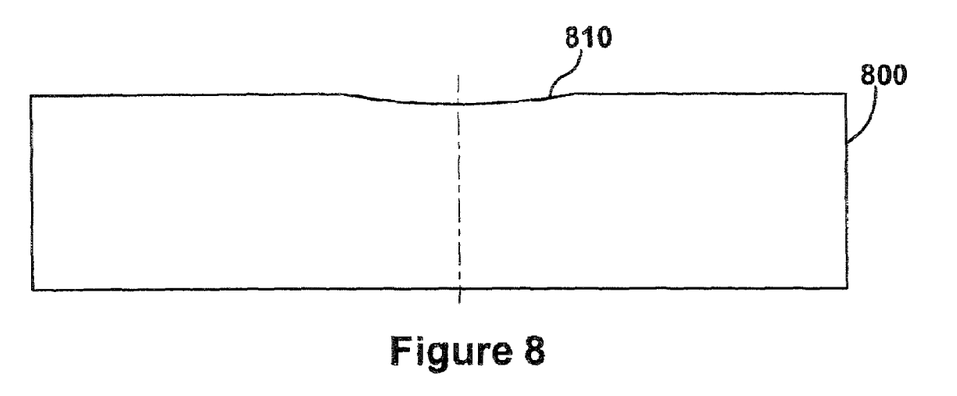
FIG. 8 shows a cross section of a second reflector in the Fabry-Perot interferometer with a spherical depression.

Additionally, the performance of the Fabry-Perot interferometer based sensor could be improved by machining a concave spherical depression 810 as depicted in FIG. 8 in the center of the diaphragm 800 to provide modal control of the Fabry-Perot gap. The depth of the spherical depression must be less than the minimum gap that is to be measured with the Fabry-Perot sensor.

Figure 9:
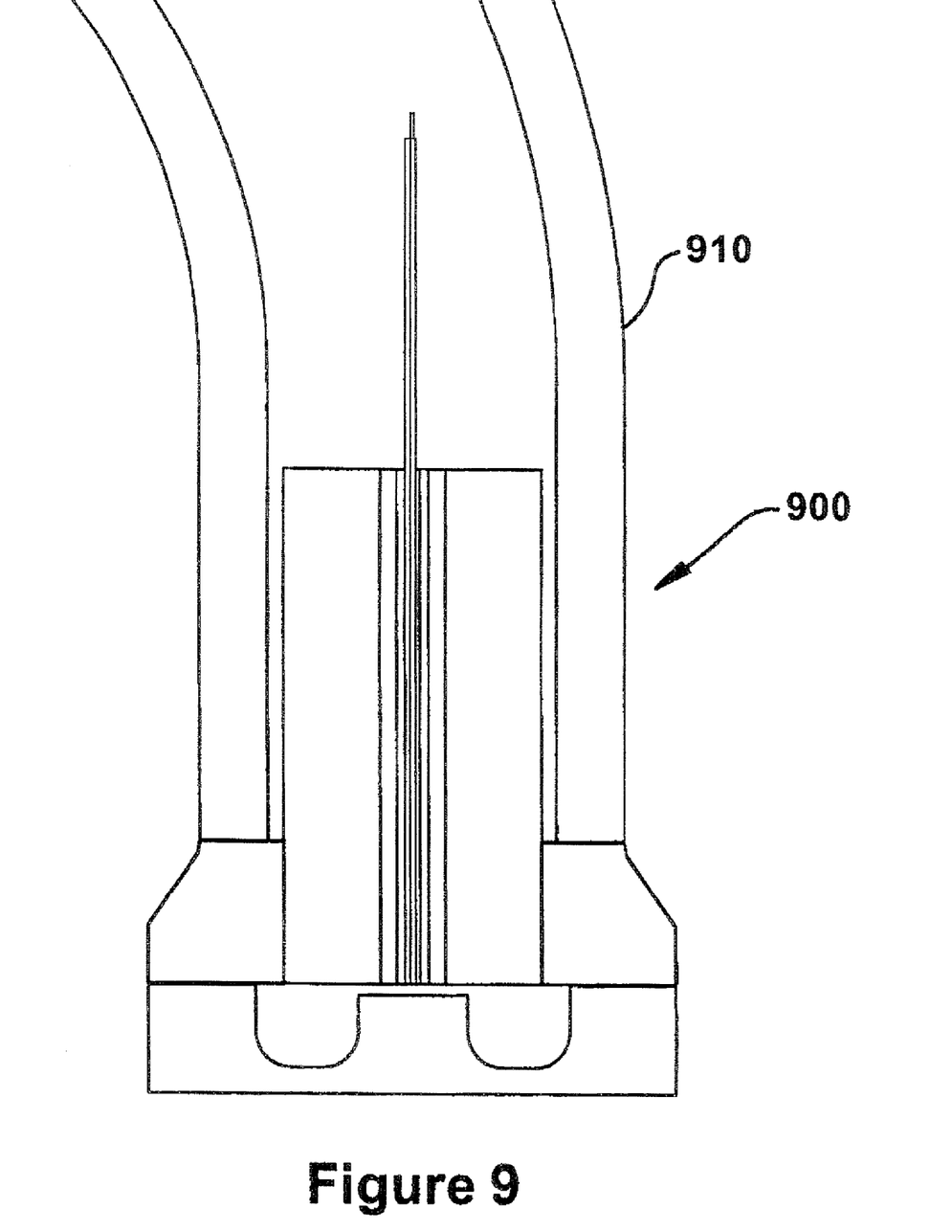
FIG. 9 shows a flexible transducer incorporating an embodiment of a Fabry-Perot interferometer based sensor.

The features of the second reflector in the Fabry-Perot interferometer based sensor combine to enable a transducer head 900 to be fabricated that is very short and very small in diameter. The small size allows the transducer head 900 to be placed on then end of a flexible probe 910 for use in locations where space and access are very limited, forming a flexible transducer. In gas turbine applications where pressure pulsations in the combustor are to be monitored, it is desirable to install the pressure transducers and other sensors as close as possible to the combustion zone. Combustor baskets in Siemens Westinghouse turbines contain J-tubes used to examine the combustor basket with a boroscope. A flexible transducer may be installed in this location but there are physical limitations to the size of the transducer head and the pigtail assembly that contains the leads. It is straightforward to design and build a fiber optic transducer that fits within the size envelope defined by the gas turbine combustor basket J-tube. One design is shown in FIG. 9. The size constraints include the diameter and length of the transducer and the flexibility of the pigtail assembly that must be pressure sealed.

While the present invention has been described with reference to the preferred embodiment, obviously other embodiments, modifications, and alternations could be ascertained by one skilled in the art upon reading the present disclosed. The present invention is intended to cover these other embodiments, modifications, and alterations that fall within the scope of the invention upon a reading and understanding of this specification.

The invention claimed is:

1. A sensor assembly comprising:
an optical fiber having an optical axis;
a lens in optical communication with said optical fiber, said lens having an optical axis and said lens capable of transmitting a beam of light;
a reflective surface, said reflective surface spaced from said lens such that said beam of light transmitted from said lens is capable of reflecting from said reflective surface back to said lens; and
an alignment device capable of aligning said beam of light transmitted from said lens substantially perpendicular with said reflective surface.

2. The sensor assembly of claim 1, further comprising a transparent window with a partially reflective surface, wherein said partially reflective surface of said window is substantially parallel with and is separated by a gap from said reflective surface, said optically transparent window and said reflective surface forming a Fabry-Perot sensor.

3. The sensor assembly of claim 2, wherein said lens comprises at least one of: a ball lens; a graded index lens; a lens that focuses light; and a lens that collimates lights.

4. The sensor assembly of claim 3, further comprising a ferrule encasing said optical fiber, said ferrule aligning said optical axis of said optical fiber with said optical axis of said lens.

5. The sensor assembly of claim 3, wherein said ball lens is attached to said optical fiber to align said optical axis of said optical fiber with said optical axis of said lens.

6. The sensor assembly of claim 5, wherein said ball lens is attached to said optical fiber by melting or bonding said ball lens to said optical fiber.

7. The sensor assembly of claim 4, wherein said ball lens is not attached to said optical fiber.

8. The sensor assembly of claim 1, wherein said alignment device comprises:
a body having a socket aperture;
a ball rotatably positioned in said socket aperture;
wherein at least a portion of said optical fiber is positioned within said ball.

9. The sensor assembly of claim 8, wherein said ball is rotatable to align said beam of light transmitted from said lens substantially perpendicular with said reflective surface.

10. The sensor assembly of claim 1, wherein said alignment device comprises a wedge shaped window located between said lens and said reflective surface.

11. The sensor assembly of claim 1, wherein said alignment device comprises a wedge shaped spacer located between said lens and said reflective surface.

12. The sensor assembly of claim 1, wherein said alignment device comprises a transducer body having an axis and an end surface, said end surface machined at an angle relative to said transducer body axis to align said beam of light transmitted from said lens substantially perpendicular with said reflective surface.

13. The sensor assembly of claim 1, wherein said reflective surface is a diaphragm.

14. The sensor assembly of claim 13, wherein said diaphragm comprises at least one of: a flat diaphragm; a mesa diaphragm; a plug diaphragm; and a bellows diaphragm.

15. The sensor assembly of claim 13, wherein said diaphragm has a dielectric reflective surface.

16. The sensor assembly of claim 15, wherein said diaphragm comprises a mesa diaphragm, said mesa diaphragm comprising a circular groove substantially surrounding said dielectric reflective surface.

17. The sensor assembly of claim 13, wherein said diaphragm has a flat or a concave reflective surface.

18. The sensor assembly of claim 1, further comprising a flexible tube encasing at least a portion of said optical fiber to form a flexible transducer.

19. A Fabry-Perot sensor assembly comprising:
an optical fiber;
a ball lens in optical communication with said optical fiber said ball lens capable of transmitting a beam of light;
a window having a first surface and a second surface;
a diaphragm spaced from and parallel to said second surface of said window, said diaphragm having a partially reflective surface; and
an alignment device capable of aligning said beam of light transmitted from said ball lens substantially perpendicular with said partially reflective dielectric coating of said diaphragm.

20. The Fabry-Perot sensor assembly of claim 19, wherein said ball lens is attached to said optical fiber.

* * * * *